United States Patent [19]

Kumpf

[11] 3,816,246

[45] June 11, 1974

[54] CONCRETE PRESSURE VESSEL FOR PRESSURIZED OR BOILING-WATER NUCLEAR REACTORS

[75] Inventor: Hermann Kumpf, Wendelstein, Germany

[73] Assignee: Kraftwerk Union Aktiengesellschaft, Milheim (Ruhr), Germany

[22] Filed: Mar. 17, 1972

[21] Appl. No.: 235,590

[30] Foreign Application Priority Data
Mar. 20, 1971 Germany.............................. 2113672

[52] U.S. Cl.................... 176/65, 176/60, 176/61, 176/59
[51] Int. Cl.. G21c 15/10, G21c 15/12, G21c 15/26
[58] Field of Search............. 176/50, 51, 59, 60, 61, 176/65

[56] References Cited
UNITED STATES PATENTS

| | | | |
|---|---|---|---|
| 3,121,046 | 2/1964 | Trickett et al.................... | 176/59 X |
| 3,124,514 | 3/1964 | Koutz et al...................... | 176/59 |
| 3,158,543 | 11/1964 | Sherman et al................... | 176/61 X |
| 3,159,550 | 12/1964 | Laming............................. | 176/61 X |
| 3,175,958 | 3/1965 | Bourgade......................... | 176/51 X |
| 3,240,678 | 3/1966 | Hemmerle et al. ................ | 176/50 |
| 3,322,643 | 5/1967 | Sprague et al.................... | 176/59 |

Primary Examiner—Carl D. Quarforth
Assistant Examiner—Roger S. Gaither
Attorney, Agent, or Firm—Herbert L. Lerner

[57] ABSTRACT

Concrete pressure vessel for a pressurized or boiling-water nuclear reactor includes a cool sealing wall engaging the inner surface of the concrete pressure vessel, a hot inner wall surrounding the reactor and spaced from said cool sealing wall, and at least one intermediate wall disposed between said cool sealing wall and said hot inner wall substantially parallel and in spaced relationship thereto, said intermediate wall being formed with a limited number of passage openings therethrough for conducting coolant flows from the space between said intermediate wall and said cool sealing wall to the space between said intermediate wall and said hot inner wall.

2 Claims, 12 Drawing Figures

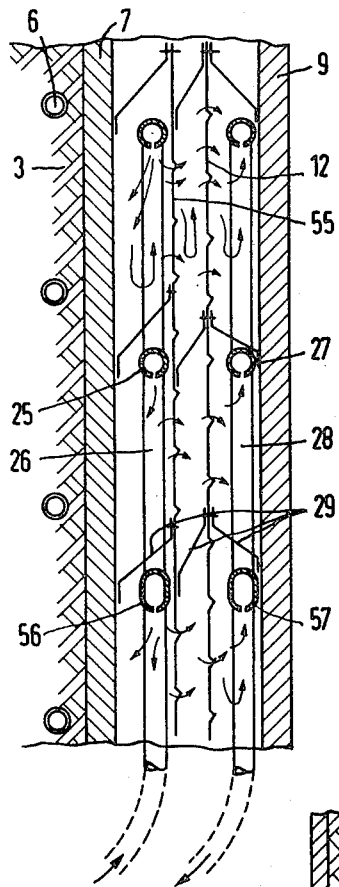
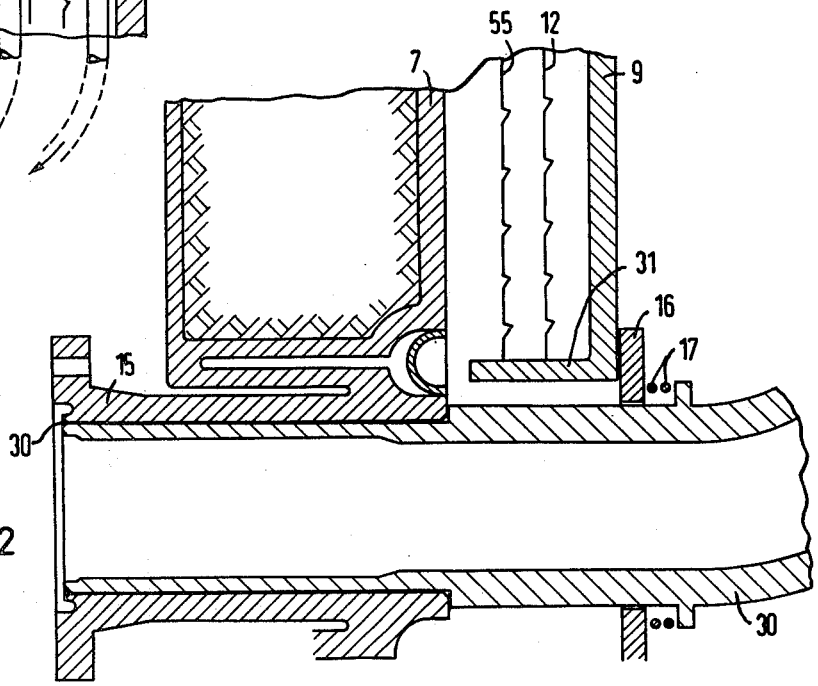

CONCRETE PRESSURE VESSEL FOR PRESSURIZED OR BOILING-WATER NUCLEAR REACTORS

The invention relates to a concrete pressure vessel for pressurized or boiling-water nuclear reactors with a cooling system for the walls thereof.

It has been known, heretofore, to provide a heat insulation in the vicinity of the sealing wall of concrete pressure vessels, which is produced by stagnant layers of liquid. It has also been attempted heretofore to achieve a form of heat insulation by providing gaseous or porous, poorly heat-conductive media in this vicinity. The embodiments of such heat insulation heretofore, however, are often considered to be unsatisfactory. Moreover, they demand a relatively high cost for development.

It is accordingly an object of the invention to provide a concrete pressure vessel for pressurized or boiling-water reactors which avoids the foregoing disadvantages of the heretofore known pressure vessels of this general type.

With the foregoing and other objects in view, there is provided, in accordance with the invention, a concrete pressure vessel for a pressurized or boiling-water nuclear reactor comprising a cool sealing wall engaging the inner surface of the concrete pressure vessel, a hot inner wall surrounding the reactor and spaced from the cool sealing wall, and at least one intermediate wall disposed between the cool sealing wall and the hot inner wall substantially parallel and in spaced relationship thereto, the intermediate wall being formed with a limited number of passage openings therethrough for conducting coolant flows from the space between the intermediate wall and the cool sealing wall to the space between the intermediate wall and the hot inner wall.

In accordance with another feature of the invention, the cooling medium comprises water from a primary circulatory loop of the reactor which flows in sections radially inwardly from the outside, the heat from which, absorbed in the cooling process, is transferred to the feed water of a steam power generating system associated with the reactor.

In accordance with a further feature of the invention, the intermediate wall is formed of relatively thin sheet metal formed with corrugations or provided with other spacers for supporting the same against the adjacent walls.

The continuous heat is then used in its entirety for preheating the feed water, and therefore fully benefits the steam generation system. It is accordingly possible to supply part of the feed water directly in this manner, or to re-cool in an open or closed circuit a suitable quantity of the primary coolant by means of the feed water.

In addition to the aforedescribed measures or by themselves, coils of pipe are disposable directly into separated spaces through which the feed water flows, substantially radially inwardly from the outside, i.e., from cold to warm zones.

Other features which are considered as characteristic for the invention are set forth in the appended claims.

Although the invention is illustrated and described herein as embodied in concrete pressure vessel for pressurized or boiling-water nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawing, in which:

FIG. 11 is an enlarged fragmentary view of FIG. 1 showing a modification in the pressure vessel wall thereof; and FIG. 12 is an enlarged view of FIG. 8 showing a modification thereof.

Figure 1:
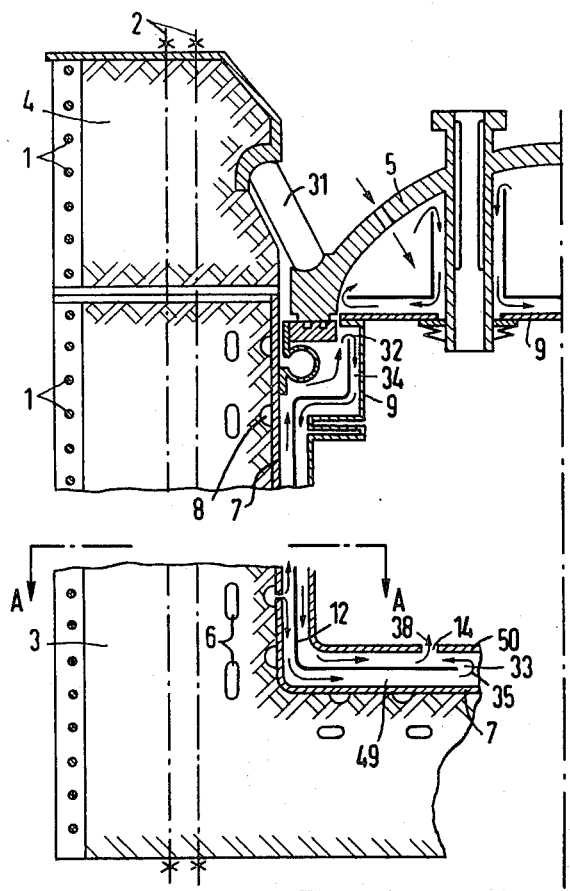
FIG. 1 is a fragmentary half-sectional view, partly diagrammatic, of one embodiment of the concrete pressure vessel of the invention.
Figure 3:
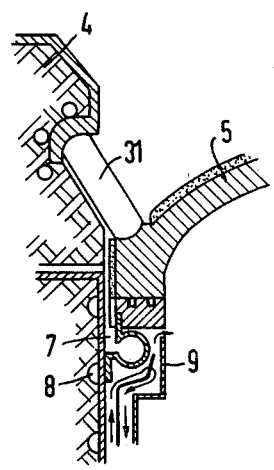
FIG. 3 is another fragmentary view of FIG. 1 showing a modification thereof.

Referring now to the drawings, and first to the embodiment of FIG. 1, there are shown broken-away sections of a concrete pressure vessel wherein a cylindrical casing 3 is provided with an annular reinforcement 1 and an axial reinforcement 2 in the form of stressed tie rods or tension rods. This reinforcement also goes through the cover ring 4 of the pressure vessel. Toward the top thereof, the reactor is closed by a metal cover 5 by a releasable bone or tumbler-like lock (Knochenverschluss) 31. Whereas a cover located in the cold zone of the reactor is illustrated in FIG. 1, there is shown in FIG. 3 an application of the invention to a cover located in the hot zone of the reactor.

Figure 2:
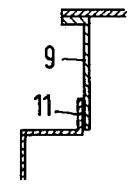
FIG. 2 is a fragmentary view of FIG. 1 showing a modification thereof.
Figure 4:
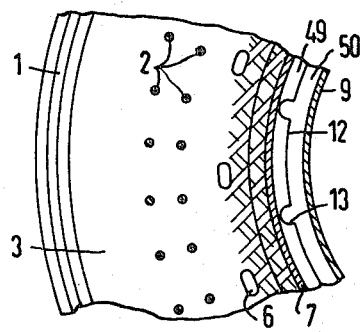
FIG. 4 is a fragmentary top plan view of FIG. 1.

A cool sealing skin 7 in the form of a thin sheet-metal wall is in contact with the inner wall of the vessel, as is apparent also in the top plan view of FIG. 4. In the immediate proximity of the sheet-metal wall 7, a pipe system 8 for feeding in coolant for cooling the wall is located. At a distance from the sealing skin 7, there is located an inner wall 9 which surrounds the reactor proper and is exposed to high temperatures. This sheet metal wall 9, as shown in FIG. 1, is provided with elastic members 10 for equalizing thermal expansions. However, it is also possible, as shown in FIG. 2, to provide sliding members 11 for the equalization of thermal expansion.

Between the sealing skin 7 and the inner wall 9, there is located at least one intermediate wall 12 which is supported against the adjacent walls by suitable spacers. In the embodiment shown in FIG. 1 and FIG. 4 suitable corrugations 13 are formed in the intermediate wall 12 which assure the maintenance of a predetermined wall spacing with sufficient accuracy. Naturally, several intermediate walls can be provided instead of the one intermediate wall 12, in which case each wall bears against the adjacent walls by means of suitable corrugations.

The coolant flow travels basically from outside to inside, i.e., from the sealing skin 7 toward the inner wall 9. Primary water at the same pressure as in the pressure vessel can be used as coolant. The coolant flow travels in sections around the intermediate walls, passage openings being formed at given locations thereof. In the embodiment illustrated in FIG. 1, the surface of the edges of the intermediate wall 12 is of such limited size that slots 32 and 33 are formed through which the coolant flow passes in the direction of the arrows 34 and 35 from the outer space 49 to the inner space 50.

Figure 5:
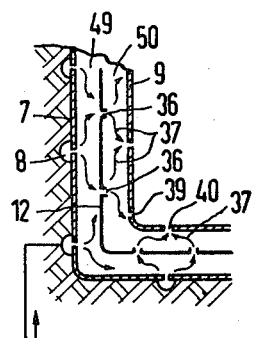
FIGS. 5, 6 and 7 are fragmentary views of the same part of FIG. 1 showing three different modifications thereof.

In the embodiment shown in FIG. 5, passage openings 36 are formed in the intermediate wall 12, which allow the coolant to pass from the space 49 to the space 50 in the direction of the arrows 37.

The coolant, which is heated up in the cooling process, can be introduced into the primary circulatory loop of the reactor at a suitable point. Thus, there is provided in the embodiment shown in FIG. 1, an opening 14 through which the coolant flows in the direction of the arrow 38 into the interior of the vessel. In a corresponding manner there can be provided, however, as shown in FIG. 5, a multiplicity of openings 39 formed in the sealing wall 9 through which the coolant flows into the interior of the reactor in the direction of the arrows 40.

Figure 6:
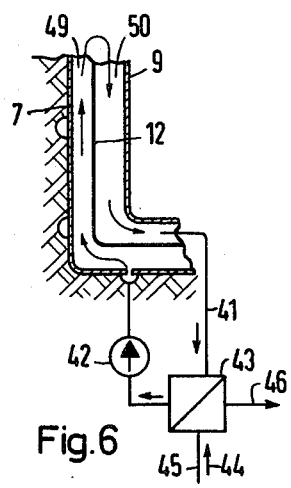

In order to effect a preheating of the feedwater, a closed circuit 41 with a circulating pump 42 can be formed for the coolant, as shown in FIG. 6, wherein by means of a heat exchanger 43, the feedwater entering in the direction of the arrow 44 through the line 45 is heated up and introduced through the line 46 into the steam power circuit. While the constructions shown in FIGS. 1 and 5 are suited particularly for boiling-water reactors, the embodiment according to FIG. 6 merits consideration especially for pressurized water reactors.

Figure 7:
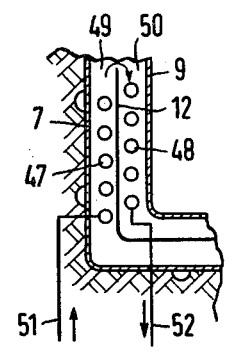

In the embodiment shown in FIG. 7, the pipe coils 47 and 48 are located in the spaces 49 and 50 on both sides of the intermediate wall 12. Here also, the feedwater can be introduced directly through the line 51 and brought out again through the line 52. It would, of course, also be possible to use an intermediate circulatory loop in which re-cooling of the coolant takes place an a heat exchanger in a manner similar to that of the embodiment shown in FIG. 6.

Figure 8:
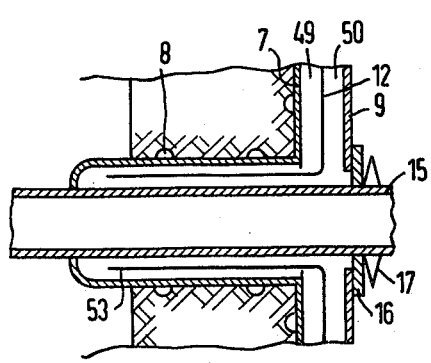
FIGS. 8 and 9 are enlarged fragmentary views of FIG. 1 showing two different forms of movable sealing members for a pipe passing through a wall.
Figure 9:
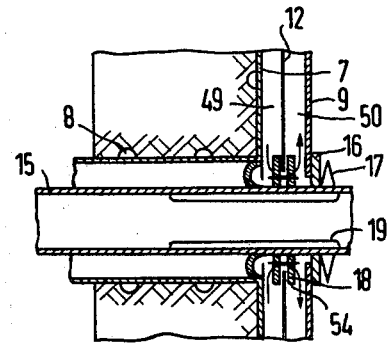

At locations where displacements caused by temperature or pressure occur, for example where pipes pass through walls, sufficient sealing can easily be accomplished with displaceable sealing elements, as is shown particularly in FIGS. 8 and 9. According to the embodiments shown in FIGS. 8 and 9, a ring 16 which is displaceable with little clearance on the pipe 15 passing through the wall, is biased by a spring 17 against the inner wall 9. Such a seal is tight enough as no appreciable pressure difference exists on both sides of the inner wall 9.

Small leaks between the sheet-metal walls and the interior space are virtually of no importance, because no appreciable pressure differences exist. In the embodiment shown in FIG. 8, the intermediate wall 12, in the region where the pipe 15 extends through the wall, is provided with a cylindrical extension 53 which extends over the entire region of the wall passed through.

In the embodiment shown in FIG. 9, the intermediate wall 12 ends at the location at which the pipe 15 passes through the wall. The sealing is effected thereat by two washers 18 and 54 that are slightly pressed together. The pipe 19 is a liner pipe with a layer of water located behind it, in order to mitigate sudden temperature differences in the pipe 15.

Figure 10:
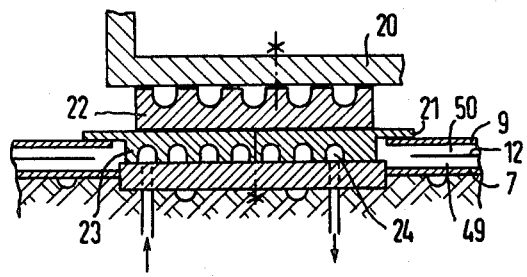
FIG. 10 is a slightly reduced fragmentary view of FIG. 1 showing a support bearing for the reactor core container.

FIG. 10 shows the application of the invention in the vicinity of a support bearing which, for example, supports the nuclear core container 20. The sliding sealing portions 21 permit a given amount of movement of the inner wall 9. The sealing portions can, of course, also be located at the displaceable sliding member 22, which affords certain further advantages. The sliding member 22, at that location, slides with the smooth, hard inner surface thereof on the slide member 23. The recesses 24 serve to reduce the heat conduction cross section. A branch of the coolant flow passes through the recesses 24 formed in the sliding member 23.

It is advantageous to secure the intermediate walls as well as the coolant feed and discharge lines at the inner wall 9, so that they can be brought into the vessel together with the latter and can also be removed therefrom, if the pressure vessel has an upper opening having the full cross section of the interior and therefore affords the possibility of inspection. One or more redundant emergency cooling loops can, of course, be provided which become effective in the event of failure of the re-cooling system for the feedwater flow.

In the embodiment illustrated in FIG. 1, there is shown a fragment of a cross-sectional view of the concrete vessel wall 3, wherein a second intermediate wall 55 is provided, in addition to the intermediate wall 12. The two intermediate walls 12 and 55, as well as the feed and discharge lines for the coolant, are secured at spaced intervals to the inner wall 9. The coolant feed lines 25, together with their vertical connecting pipes 26, form a type of tube grid in which the mesh width may be about one meter, for example. Similarly, the discharge lines 27 with their vertical connecting pipes 28 can also form a tube grid. In the lower area, where large pipe cross sections are required, the pipes 56 and 57 are constructed as oval pipes. The spaces between the partitions 12 and 55 are separated in elevational direction and this separation can be at about the spacing of the tubular grid. The separation is effected by resilient sheet metal straps 29, which are subdivided in the peripheral direction and are secured to the walls at one side. The flow through the intermediate spaces occurs in sections according to the arrows shown in direction from the outside to the inside, through mutually offset holes formed in the intermediate walls 12 and 55. Advantageously, a larger number of passage openings are located in the upper region of each vertical section than in the lower region thereof.

In FIG. 12 there is illustrated a pipe extension through a wall, wherein an inner pipe 30 is removable from the pipe 15 after disconnecting the attachment point 31, for instance, by cutting a weld located thereat. The inner tube 30 can now be withdrawn toward the right, i.e., towards the interior of the vessel, so that a smooth inner vessel wall remains in the sealing wall 7 which permits the removal of the entire heat insulation, as is shown, for example, in FIG. 11. Thereat, a fixed point is provided at the pass-through location for the attachment of the two intermediate walls 12 and 55. This point is designated by the reference numeral 31. A single sealing washer 16, which is biased by the spring 17 against the inner wall 9 or the pipe flange 31, respectively, therefore suffices as the seal.

I claim:

1. Concrete pressure vessel for a pressurized water nuclear reactor comprising a cool sealing wall engaging an inner surface of the concrete pressure vessel, a hot inner wall surrounding the reactor and spaced from said cool sealing wall, and at least one intermediate wall disposed between said cool sealing wall and said hot inner wall substantially parallel and in spaced relationship thereto, said intermediate wall being formed with a limited number of passage openings therethrough for conducting coolant medium from the space between said intermediate wall and said cool sealing wall to the space between said intermediate wall and said hot inner wall, said cooling medium comprising water from a primary circulatory loop of the reactor flowing radially inwardly in sections, heat absorbable by said cooling medium in a cooling process being transferable to feedwater of a steam power generating system associated with the nuclear reactor, said primary circulatory loop including a circulatory pump and a heat exchanger therein for heating the feedwater flowing therethrough.

2. Pressure vessel according to claim 1 including pipe coils disposed in both said spaces between said intermediate wall and said sealing wall, on the one hand, and said intermediate wall and said inner wall, on the other hand, for heating the feed-water flowing through said spaces.

* * * * *